N. B. HENRY.
CAKE FORMING AND CAGE LOADING MECHANISM FOR OIL PRESSES.
APPLICATION FILED JUNE 1, 1920.

1,376,275.

Patented Apr. 26, 1921.
3 SHEETS—SHEET 1.

Inventor:
Nelson B. Henry
By Mitchell, Chadwick & Kent,
Attys.

N. B. HENRY.
CAKE FORMING AND CAGE LOADING MECHANISM FOR OIL PRESSES.
APPLICATION FILED JUNE 1, 1920.

1,376,275.

Patented Apr. 26, 1921.

INVENTOR
Nelson B. Henry
BY
Mitchell, Chadwick & Kent,
ATTORNEYS.

UNITED STATES PATENT OFFICE.

NELSON B. HENRY, OF ATLANTA, GEORGIA, ASSIGNOR TO THE MURRAY COMPANY, OF DALLAS, TEXAS, A CORPORATION OF TEXAS.

CAKE-FORMING AND CAGE-LOADING MECHANISM FOR OIL-PRESSES.

1,376,275.          Specification of Letters Patent.      Patented Apr. 26, 1921.

Application filed June 1, 1920. Serial No. 385,405.

*To all whom it may concern:*

Be it known that I, NELSON B. HENRY, a citizen of the United States, residing at Atlanta, in the county of Fulton and State of Georgia, have invented certain new and useful Improvements in Cake-Forming and Cage-Loading Mechanism for Oil-Presses, of which the following is a specification.

My invention has relation to cake forming and cage loading mechanism or apparatus particularly adapted for use in connection with the extraction of vegetable oil from the cooked meats of various nuts, seeds and similar oil bearing vegetable substances, and it has for its object to provide an improved mechanism or apparatus of this sort.

My improved mechanism comprises a revoluble mold or die member made with one or more mold cavities or openings, said member being intermittently actuated, step-by-step and a presser by which each charge of cooked meats is compacted and ejected from the molding cavity or opening into a cake receiving cage or the like, these parts being organized and associated so that the opening or cavity of the molding member traverses a circular endless path which brings it alternately into coöperative relationship with a cooker and the presser and so that, during one interval of rest of the revoluble molding member the cavity of the latter is in position to receive a charge of cooked meats from a cooker, after which the said member is moved to bring the loaded cavity into coöperative position with relation to the presser, which is operated during another period of rest of said member, to compact said charge and transfer the same, now formed into a cake, from the revoluble member to the cage or other receiver.

In the best form of my invention the revoluble member is made with a plurality of molding openings or cavities and during each period of rest of said member one cavity is loaded with a charge from the cooker while the press operates upon a previously delivered load or charge within another cavity.

Another feature of my invention in its best form consists in constructing and arranging the parts so that during each period of rest of the revoluble member an empty cavity thereof is stopped during its travel from the press toward the cooker in an accessible position to permit of the insertion therein of certain devices and at the same time a loaded cavity is stopped during its travel from the cooker toward the press in an accessible position to permit of the placing of certain devices on top of the charge or load.

Other features of my invention are hereinafter pointed out.

In the accompanying drawings:

Fig. 8 is a plan view, partly in section, of portions of the driving and stop mechanisms for the gear ring hereinafter referred to.

Figure 1:
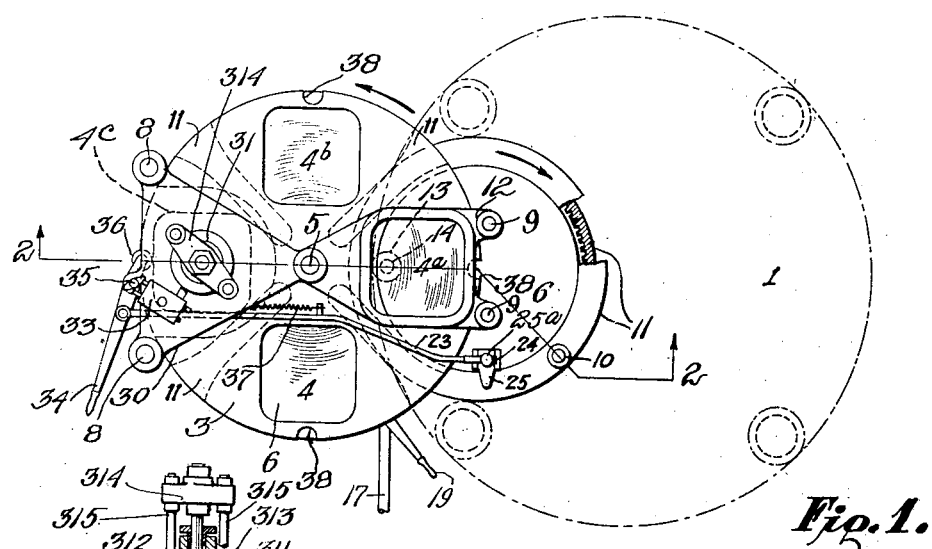
Figure 1 is a top plan view of an apparatus constructed in accordance with my invention, with the parts in the positions occupied by them when the ram 32 is lowered.

In the process of extracting vegetable oil from cooked meats of the kind referred to above a specially constructed container known as a cage is sometimes employed, within which a multiplicity of cakes are stacked. The cage when completely loaded with cakes, is placed within a press which compresses the stack of cakes endwise to express the oil, after which the cage is removed from the press, emptied of its contents, refilled with cakes, and the operation repeated. My improved mechanism receives the cooked meats from the cooker, forms the same into uniform individual cakes, and stacks the latter within the cage.

Referring to the drawings, 1 is a cooker (indicated by dotted lines in Figs. 1 and 2) of any desired type and having an outlet 2 through which the contents of said cooker discharge by gravity. Below this outlet 2 is a revoluble molding member 3 herein shown as a disk having four molding cavities or apertures 4, 4ª, 4ᵇ and 4ᶜ. Disk 3 is journaled at its center upon a fixed post 5 and is slidably supported upon a table 6 which is supported in an elevated position above a bed plate 7 by the post 5 and four other posts 8 and 9. Upon its under side the disk 3 is made with four radial slots 41 angularly disposed ninety degrees apart, said slots being open at their outer ends and formed to coöperate with a roll 10 provided upon the top side of an internal gear ring 11. This gear ring is rotatably supported upon the table 6, whose top both within and outside of said ring is flush with the top of the latter.

The internal gear ring 11 is driven by a pinion 13 fast on the upper end of a short vertical shaft 14 journaled in a bearing on a bracket secured to the under side of table 6. At its lower end shaft 14 carries a bevel gear 15 driven by a bevel gear 16 fast on a horizontal shaft 17 journaled in bearings on said bracket. This shaft 17 carries a loose pulley 18 constituting one member of a clutch whose other member 18$^a$ is splined on said shaft so as to be slidable thereon toward and from pulley member 18 to engage and disengage the latter. The pulley 18 is continuously driven by means of a belt, not shown.

Immediately above the disk 3 is a bracket 12, supported by the posts 5 and 9, which is formed with an aperture 29 through it that is of the same size and shape at its lower end as the molding apertures 4, 4$^a$, etc., of disk 3. At its upper end the aperture 29 communicates through outlet 2 with cooker 1 while the lower end thereof occupies a position immediately above the path of apertures 4, 4$^a$, etc., so as to exactly register with each of the latter as it comes into position below said aperture 29. Above bracket 12 is another bracket 30, triangular in shape as viewed in plan, which is supported by the posts 5 and 8, said bracket 30 having fixed to it a cylinder 31 formed at its lower end with a ram chamber 311 and at its upper end with a ram chamber 312. Within lower chamber 311 is arranged a relatively large vertically movable ram 32 while a smaller ram 313 movable vertically within upper chamber 312 has its upper end connected by means of a cross head 314 and two rods 315 with the head of ram 32. Thus the rams 313 and 32 are connected so as to move together. Ram 32 is lowered by admitting oil or similar fluid under pressure to chamber 311 and simultaneously connecting chamber 312 with an outlet or exhaust, while upward movement of the ram is effected by admitting fluid under pressure to chamber 312 and simultaneously connecting chamber 311 with the outlet or exhaust. The supply and exhaust of fluid to and from the two chambers 311 and 312 is controlled by valve means 33 which in turn is operated and controlled manually through a hand lever 34 fulcrumed at 35 upon bracket 30. When swung toward the right, Fig. 1, lever 34 operates the valve means to connect chamber 312 with the fluid supply and chamber 311 with the exhaust thus raising ram 32, and when swung toward the left said lever operates said valve means to connect chamber 311 with the fluid supply and chamber 312 with the exhaust thus lowering ram 32. Lever 34 carries a cam roll 36 which is moved toward and from disk 3 when said lever is swung on its fulcrum. The roll 36 is yieldingly urged toward disk 3 by a spring 37 one end of which is fastened to bracket 30 and the opposite end to a rod 23 pivotally connected at one end to lever 34. At its opposite end rod 23 is made with a wedge block 24 occupying a slot formed in a sleeve 25$^a$ loosely mounted upon the upper end of a vertical rock shaft 22 journaled in table 6 (see Figs. 3 and 4). Sleeve 25$^a$ occupies a position within a yoke 26, (Figs. 4 and 6) resting upon table 6 and fastened to the rock shaft 22. Within this yoke is also arranged an arm 25 having a round hole 25$^b$ formed therethrough that is occupied by the sleeve 25$^a$, said sleeve being provided at its lower end with an annular outwardly projecting flange on which arm 25 rests. The arm 25 is free to move vertically within yoke 26 but said arm and yoke are interlocked so that they must rotate together. As will be clear, movement of wedge 24 toward the right, Fig. 4, raises sleeve 25$^a$ and arm 25 while movement of said wedge toward the left, back to the position shown in Fig. 4, permits said sleeve and arm to be lowered, the arm 25 sliding vertically within the yoke 26 and sleeve 25$^a$ sliding vertically on the upper end of rock shaft 22 during such movements of the wedge. When arm 25 is in its lowermost position its free end occupies a position in the path of roll 10 but when lifted by movement of wedge 24 toward the right as shown in Fig. 4, it is lifted from the path of said roll 10.

Figures 2, 3, 4, 5, 6:
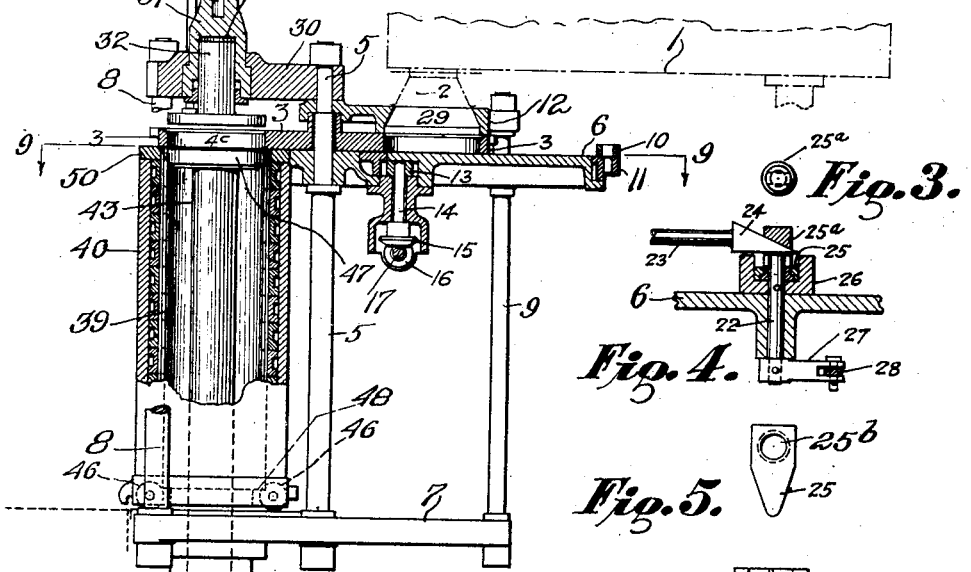
Fig. 2 is a section on line 2—2 of Fig. 1, except that the ram 32 is shown in its elevated position.
Figs. 3, 4, 5 and 6 are detail views relating to the stop mechanism hereinafter described.
Figure 7:
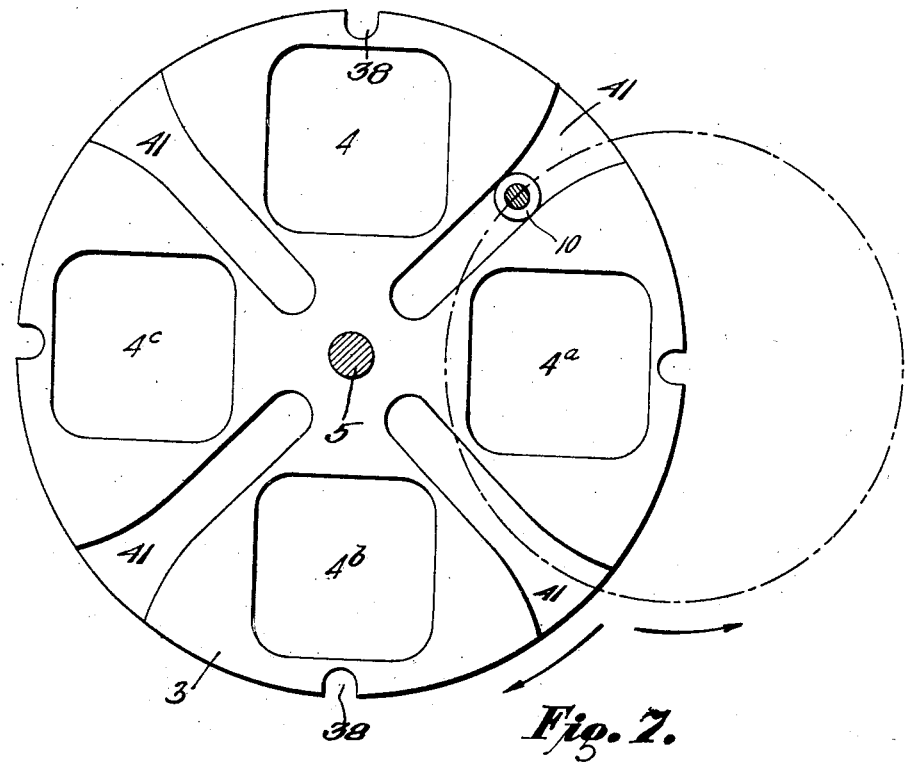
Fig. 7 is a bottom plan view of the revoluble member hereinafter described.
Figure 8:
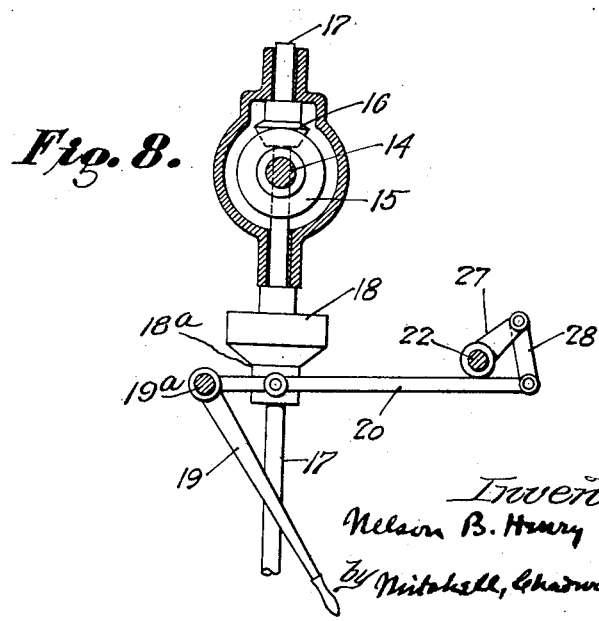

Fixed to the lower end of rock shaft 22 is an arm 27 connected by a link 28 with one arm, 20, of a bell-crank lever 19—20 fulcrumed at 19$^a$ upon a stud projecting downwardly from table 6 (Figs. 4 and 8). The arm 20 engages the movable clutch member 18$^a$ so that when said arm is swung toward pulley 18 the clutch is set and when swung away from said pulley the clutch is unset. In the drawings the arm 20 is in position setting the clutch and the gear ring 11 is being driven in the direction of the arrow, Fig. 9. The parts are so arranged or adjusted that only when lever 34 is swung to the full limit of its movement toward the right, is arm 25 raised above the path of roll 10 by wedge 24. In the drawings, Figs. 1 and 3 the lever 34 is shown at the limit of its movement toward the left with disk 3 locked immovably in the position shown through the engagement of roll 36 with one of four peripheral notches 38 with which said disk is provided. Notches 38 are spaced ninety degrees apart and positioned so that when any one of them is occupied by the roll 36 one of the molding apertures 4, 4ª, etc., is in position immediately below and in register with aperture 29 of bracket 12, another of said disk apertures is directly between ram 32 and the upper end of the interior chamber 39 of a cage 40, said ram and cage being in axial alinement, another of said apertures is at rest midway of its travel from ram 32 to aperture 29, while the fourth aperture is at rest midway of its travel from aperture 29 to ram 32.

Figure 9:
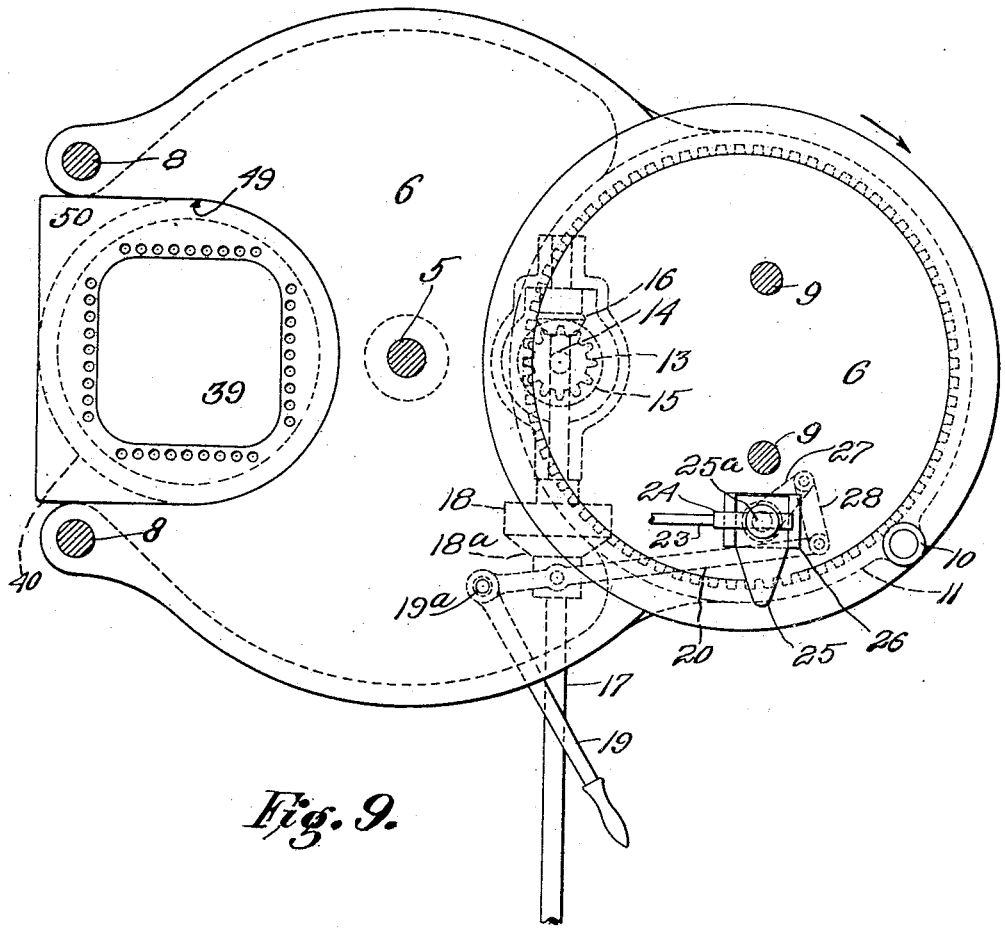
Fig. 9 is a section on line 9—9 of Fig. 2.

During each revolution of gear ring 11 the roll 10 engages one of the four slots 41 and moves disk 3 on its axis ninety degrees, but it will be clear that if, after any step movement of said disk, the operator does not either swing arm 19 of bell-crank 19—20 toward the left, Figs. 1 and 9, to unset clutch 19—18ª or swing lever 34 its full distance toward the right to unlock the disk and raise ram 32, then roll 10 will engage arm 25 and swing it toward the left, Fig. 1. This movement of arm 25 by roll 10 acts through yoke 26, rock shaft 22, arm 27, link 28 and arm 20, to unset clutch 18—18ª and thereby automatically stop ring 11. When thus moved by roll 10 the arm 25 swivels on sleeve 25ª which is held against turning by wedge 24.

Bed plate 7 supports a cylinder 42 containing a second ram 43 disposed in axial alinement with the upper ram 32. Through a pipe 44 connected therewith oil or other fluid under pressure may be supplied to said cylinder to raise the ram 43. Another pipe 45 equipped with an automatically acting relief valve 461 is connected with cylinder 42, said relief valve operating to cause the oil admitted to the cylinder via pipe 44 to yieldingly support the ram 43. That is, the relief valve permits the ram 43 to yield downwardly when a predetermined pressure is applied thereto in that direction. This ram 43 is arranged so that when at the limit of its downward movement its upper end is about flush with the top of base plate 7.

The cage 40 is provided at its lower end with wheels or trucks 46 upon which it rests and may be moved about. The interior chamber 39 of the cage is of the same cross-sectional shape as the apertures 4, 4ª, etc., of disk 3 and is open at each end thereof except that a false bottom 47 is arranged therein which is slidable lengthwise of chamber 39. Normally this false bottom 47 is at the lower end of chamber 39 resting upon shoulders 48.

In placing an empty cage in position to be filled said cage is rolled onto bed plate 7 in position between rams 32 and 43 and with its upper end portion occupying a cage positioning socket 49 formed in table 6. This socket 49 is shaped to fit the non-circular upper end portion 50 of the cage (Fig. 9), the engagement of said non-circular portion 50 with said socket positioning the cage both angularly or rotatively and laterally so that when it is properly placed within said socket its chamber 39 registers exactly with each aperture of disk 3 while the latter dwells, in position, immediately above the cage.

When an empty cage is placed in position on bed plate 7 its false bottom is raised and supported by ram 43 with its top substantially flush with the top of table 5 so that it forms the bottom of a mold cavity when the first cake is forced into the cage by ram 32 and thereafter supports successively superposed cakes (which are forced down into the cage until the cage is full) as the cakes are forced from successive molding apertures upon the previously transferred cakes. The uppermost of these cakes after the initial cake constitutes the closure or bottom of a mold or die within which a cake is first compacted and from which it is thereafter transferred to the cage.

At right angles to the apertures or dies 4ª and 4ᶜ and diametrically opposite each other are the dies 4 and 4ᵇ, the former being empty and having been stopped while traveling toward cooker 1 and the latter being filled with meat and having been stopped while traveling toward the cage filler made up of rams 32 and 43. The die or mold aperture 4 occupies a position at which a plate and cloth may be placed therein to form the bottom of the cake while the die or mold aperture 4ᵇ occupies a position at which the operator can place a cloth and plate on top of the charge of meats contained therein to form the top of the cake.

It is manifest that it is important that the disk 3 be revolved with a periodic or step-by-step movement to give a period of rest for each die in its successive positions, namely, when the bottom plate and cloth are inserted; when the die is filled with meats from the cooker; when the upper cloth and plate are placed on top of the meats in the die, and when the meats inclosed between the upper and lower plates and cloths are compacted and transferred to the cage.

What I claim is:

1. Cake forming mechanism having in combination a die member having a die opening formed therethrough; a table on which said die member is rotatably mounted and which serves as a closure for the lower end of said die opening, said table being formed with an opening therethrough across which said die opening passes during the rotation of said member; means for actuating said die member step-by-step to alternately present said die opening to a cooker outlet and bring it to rest over the table opening, and means for ejecting the contents of the die opening while the latter is at rest opposite said table opening.

2. Cake forming mechanism having in combination a die member having a plurality of die openings formed therethrough; a table on which said die member is rotatably mounted and which serves as a closure for the lower ends of said die openings, said table being formed with an opening therethrough across which said die openings pass during the rotation of said member; means for actuating said die member step-by-step to successively present one die opening to a cooker outlet and to bring another die opening over the table opening and means for ejecting the contents of each die opening while the latter is in alinement with said table opening.

3. Cake forming mechanism having in combination a die member having a plurality of die openings formed therethrough; a table on which said die member is rotatably mounted and which serves as a closure for the lower ends of said die openings, said table being formed with an opening therethrough across which said die openings pass during the rotation of said member; means for actuating said die member step-by-step to successively present the die openings to a cooker outlet and the table opening, an empty die opening which is traveling toward the cooker outlet and a loaded die opening which is traveling toward the table opening both occupying positions accessible to the operator during each period of rest of said die member, and means for ejecting the contents of each die opening while the latter is at rest opposite said table opening.

4. Cake forming and cage loading mechanism having in combination a die member having a plurality of die openings formed therethrough; a table on which said die member is rotatably mounted and which serves as a closure for the lower ends of said die openings, said table being formed with an opening therethrough across which said openings pass during the rotation of said member; means for actuating said die member step-by-step to successively present the die openings to a cooker outlet and the table opening; a vertically movable ram alined with the table opening and normally occupying a position above the rotatable die member, and means through which said ram is operated to eject the contents of each die opening while the latter is at rest opposite said table opening.

5. Cake forming and cage loading mechanism constructed in accordance with claim 4 and having also a vertically movable and yieldingly supported ram alined with the table opening and occupying a position below the rotatable die member so as to receive upon it the cakes ejected from the latter.

6. Cake forming and cage loading mechanism having in combination a die member having a plurality of die openings formed therethrough; a table on which said die member is rotatably mounted and which serves as a closure for the lower ends of said die openings, said table being formed with an opening therethrough across which said die openings pass during the rotation of said member; means for actuating said die member step-by-step to successively present the die openings to a cooker outlet and to the table openings; a vertically movable ram alined with the table opening and normally occupying a position above the rotatable die member; means through which said ram is operated to eject downwardly the contents of each die opening while the latter is at rest opposite said table opening; a cage; means for supporting said cage in position below said ram and in alinement therewith, and a vertically movable and yieldingly supported ram projecting upwardly into said cage onto which are stacked the cakes ejected from said die member by the upper ram.

7. In a cake forming mechanism the combination of a rotatably supported die member having a plurality of die openings formed therethrough; a ram stationed adjacent the path of travel of said die openings; an actuator for turning said die member step-by-step to bring the openings of the latter successively in alinement with said ram; means connecting said actuator with a source of power; means through which said ram is manually controlled to eject the contents of each die opening while the latter is at rest in alinement with said ram, said means including a manually operated control member, and automatic means for disconnecting said actuator from its source of power when said control member is moved into position to project said ram into an opening of the die member to eject the contents thereof.

8. In a cake forming mechanism the combination of a rotatably supported die member having a plurality of die openings formed therethrough; a ram stationed adjacent the path of travel of said die openings; an actuator for turning said die member step-by-step to bring the openings of the latter successively in alinement with said ram; a clutch through which said actuator is connected with a source of power; means through which to manually operate said clutch; means through which said ram is manually controlled to project it into each die opening while the latter is at rest in alinement with said ram and to retract the latter, said means including a manually operated member; and automatic means for unsetting said clutch when said control member is moved into position to project said ram into an opening of the die member to eject the contents thereof and for preventing resetting of said clutch until said control member is shifted into position to retract said ram.

9. In a cake forming mechanism the combination of a rotatably supported die member having a plurality of die openings formed therethrough, said die member being grooved and constituting the driven member of a Geneva movement; a ram stationed adjacent the path of travel of said die openings; a rotatably supported actuator for said die member carrying a roll to cooperate with the grooves of said die member, said actuator constituting the driving member of the Geneva movement; a clutch through which said actuator is connected with a source of power; means through which to manually operate said clutch; a manually operated member through which said ram is controlled; automatic clutch unsetting means including an arm movable into and out of the path of said roll, and means through which said manually operated member shifts said arm into the path of the roll so that the latter engages and operates said arm to unset clutch when said manually operated member is shifted to effect movement of said ram into an opening of the die member, and through which said manually operated member removes said arm from the path of the roll when shifted to effect the withdrawal of said ram.

10. In a cake forming mechanism the combination of a rotatably supported die member having a plurality of die openings formed therethrough; a ram stationed adjacent the path of travel of said die openings; and movable into and out of each opening while the latter is opposite said ram; means for rotating said die member step-by-step to bring the openings of the latter successively to rest opposite said ram; means for operating said ram; a control member for said ram operating means that is manually moved in one direction to effect movement of said ram away from said die member; a spring for moving said control member in the opposite direction to effect movement of said ram toward said die member; and means for permitting movement of said control member by said spring only at the conclusion of each step movement of said die member.

11. Cake forming and cage loading mechanism having in combination a cage; an open ended forming die movable from a cooker discharge outlet to and over the cage; a plate within the die above the charge and a plunger above the die and cage to compact and form the charge and expel the compacted and formed cake from the die into the cage, against the resistance of a yielding plunger.

12. Cake forming and cage loading mechanism having in combination a cage; a resistance plunger working in a cylinder and movable through the cage; a relief valve connected with that cylinder; an open ended forming die movable from a cooker discharge outlet to and over the cage and plunger; a plate within the die above the charge and an evacuating plunger above the die and cage to compact and form the charge and expel the compacted and formed cakes from the die into the cage against the adjusted resistance plunger.

Signed at Atlanta, Georgia, this eighteenth day of May, 1920.

NELSON B. HENRY.